Dec. 8, 1964     T. RENNER     3,160,475
METHOD OF PRODUCING BORON IODIDE
Filed April 13, 1964
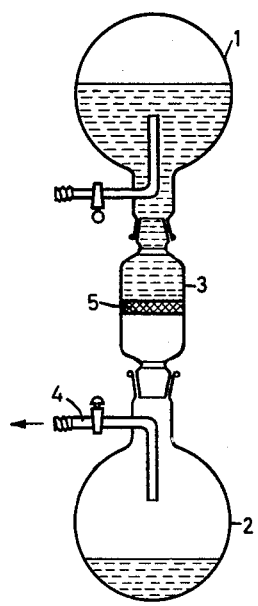

3,160,475
METHOD OF PRODUCING BORON IODIDE
Theodor Renner, Nurnberg, Germany, assignor to Siemens-Schuckertwerke Aktiengesellschaft, Berlin-Siemensstadt, Germany, a corporation of Germany
Filed Apr. 13, 1964, Ser. No. 360,483
Claims priority, application Germany, May 14, 1957,
S 53,483
12 Claims. (Cl. 23—205)

My invention is a continuation in part of my application Serial No. 732,032, filed April 30, 1958, now abandoned, and relates to a method for producing boron iodide ($BI_3$) to be employed for various chemical and other technological purposes, for example, to synthetically produce other boron compounds. My invention particularly relates to the production of boron iodide for use in the manufacture of the electrical semiconductors which consist of a compound of boron with an element of the fifth group of the periodic system, such as the semiconducting compounds boron nitride (BN), boron phosphide (BP), boron arsenide (BAs), and boron antimonide (BSb).

Several methods may be used for producing boron iodide, for example by reacting HI with $BCl_3$ at high temperature, by direct reaction of the elements B and I at 700° C. to 800° C., or by reacting HI with amorphous boron. The results of these methods are unsatisfactory, in particular, the yields are poor. This also applies to production of boron iodide by a method analogous to one used in the production of boron chloride and boron bromide, that is, form $BF_3$ or $KBF_4$ and $AlI_3$. A process to make boron iodide from $Li[BH_4]$ or $NA[BH_4]$ by reaction with elemental iodine at a temperature of 120° to 125° C. or up to 200° C., results in a better yield and also in a relatively very pure boron iodide. However, the expenditure in equipment, for the latter process, is considerable and the operation is complicated, so that this method, too, has little suitability or advantage for the production of pure boron iodide in large quantities, for industrial use.

It is an object of my invention to provide a novel method for the manufacture of boron iodide which avoids or minimizes the above-mentioned disadvantages and is suitable for large-scale production of boron iodide.

According to my invention, boron iodide is produced with the aid of an alkali boron hydride; that is, an alkali metal boron hydride. More specifically, the alkali metal boron hydride is reacted with a solution of iodine in an indifferent solvent, and after termination of the reaction which can be formulated as:

Alkali metal-$[BH_4]+4I_2\rightarrow BI_3+$alkali metal-I$+4HI$ the alkali iodide is filtered off under exclusion of air; and thereafter, if desired, the $BI_3$ is crystallized out of the solution by evaporating the solution preferably in vacuum.

It is particularly important and advantageous that the process be performed under exclusion of humidity and air.

$Li[BH_4]$ and $Na[BH_4]$ are suitable as the alkaline boron hydride, and also the corresponding compounds of potassium, rubidium, and cesium.

Suitable as the solvent is, for instance, n-hexane or n-heptane, which are in fact preferred. The reaction can take place at normal room temperature. By increasing the temperature, for instance by boiling with return flow of solvent, for example, by refluxing in a column, the speed of reaction can be greatly increased. To obtain colorless boron iodide, it is advisable to introduce the alkali boron hydride in excess into the iodine solution. This results in the iodine being completely consumed by the reaction, so that the solution becomes colorless. The excess of alkali boron hydride remaining after termination of the reaction is filtered off together with the alkali iodide occurring during the reaction.

A quantitative example is the following:

90 g. of iodine are dissolved in n-hexane. 6 g. $Li[BH_4]$ are employed for reaction therewith. The solution is boiled, the hexane vapors being condensed and returned. Upon completion of the reaction, a colorless reaction product is obtained. As stated above, the alkali iodide and excess alkali boron hydride are filtered off, under exclusion of air, and the $BI_3$ is crystallized out of solution by evaporating the solution under vacuum. The yield of $BI_3$ amounts to at least 50 to 55 g., which is considerably more than would be expected from the reaction equation. This can be explained by the considerable dissociation of the hydrogen iodide into iodine and hydrogen. The iodine evolving therefrom can again react with $Li[BH_4]$.

In a similar manner $BI_3$ was prepared using n-heptane as the solvent. 93.2 g. of iodine were dissolved in 200 ml. of n-heptane. 7 g. of $Li[BH_4]$ were employed for reaction therewith. Upon heating the solution to 98° C., the boiling point of heptane, with reflux of the heptane vapors until completion of the reaction, 47.3 g. of $BI_3$ were obtained. When the reaction was repeated but operating at 70° C. instead of 98° C., 54.2 g. of $BI_3$ were obtained. The quality of the $BI_3$ in both cases was identical to that produced when using n-hexane.

The filtering off of the LiI liberated by the reaction, and of any excess of $Li[BH_4]$, can be performed with the aid of an apparatus as illustrated on the drawing. Denoted by 1 and 2 are two spherical flasks with ground necks. An intermediate container having conical ends in tight engagement with the necks is denoted by 3. The reaction liquid is in flask 1. The intermediate container 3 contains a glass-wool filter 5. To accelerate the filtration, a negative pressure or vacuum may be applied by means of a suction tube 4. The boron iodide collects at the bottom in the flask 2, whereas the LiI and, as the case may be, also $Li[BH_4]$ remain in the filtering container 3.

The boron iodide solution, taken from flask 2, is subsequently heated to evaporate the solvent. During evaporation, which is preferably performed in vacuum, the $BI_3$ crystallizes out after a short interval of time. The $BI_3$ thus obtained, when carefully conducting the method, is colorless and has a melting point of about 49° C. It also remains colorless for an extended period of time when it is protected from humidity and light.

The boiling temperature in the above example is 68° C. The temperature generally chosen is the boiling temperature of the solvent at a pressure of 1 atmosphere. Although the process can be carried out in air, it is preferable to operate in dry nitrogen, to exclude humidity and oxygen. The process can also be carried out in vacuum; this, however, would considerably and unnecessarily complicate the operating conditions. The perferred duration of the reaction amounts to approximately 2 to 4 hours.

The process is carried out at a temperature ranging from room temperature, about 20° C., to preferably no higher than about 68° C.

The method according to the invention is characterized by extreme simplicity, and it permits large-scale production of $BI_3$, which is important as an iodizing agent for various syntheses. Of particular importance is use of the boron iodide so produced for the manufacture of semiconducting boron compounds of the type $A_{III}B_V$ by the single crystal growing method. For example, the compound BP is produced in accordance with the reaction scheme:

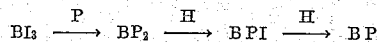

I claim:
1. A process for making boron tri-iodide ($BI_3$), com- prising treating an alkali metal boron hydride with iodine in suspension in liquid n-hexane to react the iodine with said hydride, the process being carried out in the exclusion of air, the alkali metal boron hydride being taken from the group consisting of lithium and sodium boron hydride.

2. A process of making boron tri-iodide ($BI_3$), comprising refluxing a solution of iodine and a metal boron hydride taken from the group consisting of lithium and sodium boron hydride in n-hexane in dry nitrogen, the alkali metal boron hydride being present in excess of that required by the reaction scheme:

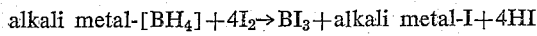

to consume the iodine to minimize colorization of the product by the iodine, and after the reaction filtering off, under exclusion of air, the excess alkali metal boron hydride with the alkali metal iodide formed in the reaction, and thereafter evaporating the solution under vacuum to crystallize out the boron tri-iodide.

3. A process for making boron tri-iodide ($BI_3$), comprising treating an alkali metal boron hydride with a solution of iodine in liquid n-hexane.

4. A process for making boron tri-iodide ($BI_3$), comprising treating an alkali metal boron hydride with a solution of iodine in liquid n-hexane, the reaction mixture being at a temperature ranging up to the boiling temperature of the reaction mixture, the alkali metal boron hydride being present in excess of that required by the following reaction scheme:

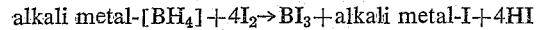

to consume the iodine to minimize colorization of the product.

5. A process for making boron tri-iodide ($BI_3$), comprising treating an alkali metal boron hydride with a solution of iodine in liquid n-hexane, the reaction mixture being at a temperature ranging up to the boiling temperature of the reaction mixture, the alkali metal boron hydride being present in excess of that required by the following reaction scheme:

alkali metal-$[BH_4]$ + $4I_2$ → $BI_3$ + alkali metal-I + 4HI to consume the iodine to minimize colorization of the product by the iodine, thereafter physically separating alkali metal-I and excess alkali metal boron hydride from the reaction mixture, and evaporating the n-hexane from the resulting solution of $BI_3$ to obtain crystals of the latter.

6. The process of claim 3, the alkali metal boron hydride being lithium boron hydride, $Li(BH_4)$.

7. The process of claim 4, the alkali metal boron hydride being lithium boron hydride, $Li(BH_4)$.

8. The process of claim 5, the alkali metal boron hydride being lithium boron hydride, $Li(BH_4)$.

9. The process of claim 3, carried out at a temperature from about 20° C. to about 68° C.

10. The process of claim 3, the alkali metal boron hydride being taken from the group consisting of lithium and sodium boron hydride.

11. A process for making boron tri-iodide ($BI_3$), comprising treating an alkali metal boron hydride with iodine in suspension in liquid n-heptane to react the iodine with said hydride, the process being carried out in the exclusion of air, the alkali metal boron hydride being taken from the group consisting of lithium and sodium boron hydride.

12. A process for making boron tri-iodide ($BI_3$), comprising treating an alkali metal boron hydride with a solution of iodine in liquid n-heptane.

References Cited by the Examiner

Schumb et al.: "Lower Iodides of Boron," American Chemical Society Journal, vol. 71, September 1949, pages 3225–3229.

Gaylord: "Reduction With Complex Metal Hydrides," Interscience Pub. Inc., New York, 1956, pages 9 and 1019.

MAURICE A. BRINDISI, *Primary Examiner.*